(12) United States Patent
Glikson et al.

(10) Patent No.: US 8,370,473 B2
(45) Date of Patent: Feb. 5, 2013

(54) LIVE MULTI-HOP VM REMOTE-MIGRATION OVER LONG DISTANCE

(75) Inventors: Alexander Glikson, Haifa (IL); Assaf Israel, Haifa (IL); Dean Har'el Lorenz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/639,018

(22) Filed: Dec. 16, 2009

(65) Prior Publication Data

US 2011/0145380 A1  Jun. 16, 2011

(51) Int. Cl.
*G06F 15/173* (2006.01)
(52) U.S. Cl. .............................. 709/223; 709/227; 718/1
(58) Field of Classification Search .................. 709/223, 709/227; 718/1
See application file for complete search history.

(56) References Cited

U.S. PATENT DOCUMENTS

| | | | | |
|---|---|---|---|---|
| 7,203,944 | B1 * | 4/2007 | van Rietschote et al. ..... | 718/104 |
| 7,313,793 | B2 * | 12/2007 | Traut et al. ........................ | 718/1 |
| 7,890,665 | B2 * | 2/2011 | Corry et al. ........................ | 710/8 |
| 8,150,971 | B2 * | 4/2012 | Lublin et al. .................. | 709/226 |
| 2003/0005102 | A1 | 1/2003 | Russell | |
| 2005/0198303 | A1 * | 9/2005 | Knauerhase et al. ......... | 709/227 |
| 2006/0195715 | A1 * | 8/2006 | Herington ......................... | 714/4 |
| 2007/0079307 | A1 * | 4/2007 | Dhawan et al. .................. | 718/1 |
| 2009/0070760 | A1 | 3/2009 | Khatri et al. | |

OTHER PUBLICATIONS

Franco Travostino et al., "Seamless Live Migration of Virtual Machines over the MAN/WAN", Elsevier Future Generation Computer Systems vol. 22, Issue 8 (Oct. 2006), pp. 901-907.

* cited by examiner

*Primary Examiner* — Thomas Dailey
(74) *Attorney, Agent, or Firm* — Daniel Kligler

(57) ABSTRACT

Methods and systems of computing, involve identifying a target location for live migration of virtual machine services, delivering the virtual machine services to an operating system from a source location, migrating the virtual machine services a first time via a data network from the source location to an intermediate location, delivering the virtual machine services to the operating system from the intermediate location, and migrating the virtual machine services a second time from the intermediate location to the target location via the data network. Breaks in the virtual machine services to the operating system while migrating the virtual machine are minimal.

21 Claims, 2 Drawing Sheets

LIVE MULTI-HOP VM REMOTE-MIGRATION OVER LONG DISTANCE

BACKGROUND OF THE INVENTION

1. Field of the Invention

This invention relates to virtual machines. More particularly, this invention relates to live remote migration of virtual machines over long distances.

2. Description of Related Art

The meanings of certain acronyms and abbreviations used herein are given in Table 1.

TABLE 1

Acronyms and Abbreviations

| | |
|---|---|
| DB | Database |
| I/O | Input/Output |
| LMB | Logical Memory Block |
| OS | Operating System |
| QoS | Quality of Service |
| TCP | Transmission Control Protocol |
| VLAN | Virtual Local Area Network |
| VM | Virtual Machine |
| VMM | Virtual Machine Manager |

In computer environments, virtualization is the creation of substitutes for real resources, that is, substitutes that have the same functions and external interfaces as their counterparts, but differ in attributes, such as size, performance, and cost. These substitutes are called virtual resources, and their users or operating systems are typically unaware of the substitution. Virtualization is commonly applied to physical hardware resources by combining multiple physical resources into shared pools from which users receive virtual resources. With virtualization, one physical resource can appear as multiple virtual resources. Moreover, virtual resources can have functions or features that are not available in their underlying physical resources. Essentially, each operating system behaves as if it has the resources of an entire machine under its exclusive control, when in fact a virtualization layer transparently provides services to the operating services, which services effectively ensure that resources are properly shared between different operating system images and their applications.

Virtual machines (VMs) may be located within the hardware of a physical host. In the latter case, virtualization may be achieved using a virtual machine manager (VMM), known as a hypervisor. A hypervisor is typically implemented by a layer of code in software or firmware that operates in a privileged environment on the physical host and interacts with underlying hardware to share its resources dynamically among several operating systems.

BRIEF SUMMARY

An embodiment of the invention provides a method of computing, which is carried out by identifying a target location for live migration of virtual machine services, delivering the virtual machine services to an operating system from a source location, migrating the virtual machine services a first time via a data network from the source location to an intermediate location, delivering the virtual machine services to the operating system from the intermediate location, and migrating the virtual machine services a second time from the intermediate location to the target location via the data network. The method is further carried out by delivering the virtual machine services to the operating system from the target location. Breaks in the virtual machine services to the operating system while migrating the virtual machine services a first time are less than a predefined limit, and breaks in the virtual machine services to the operating system while migrating the virtual machine services a second time are less than the predefined limit.

Other embodiments of the invention provide computer program products and apparatus for carrying out the above-described method.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

Figure 1:
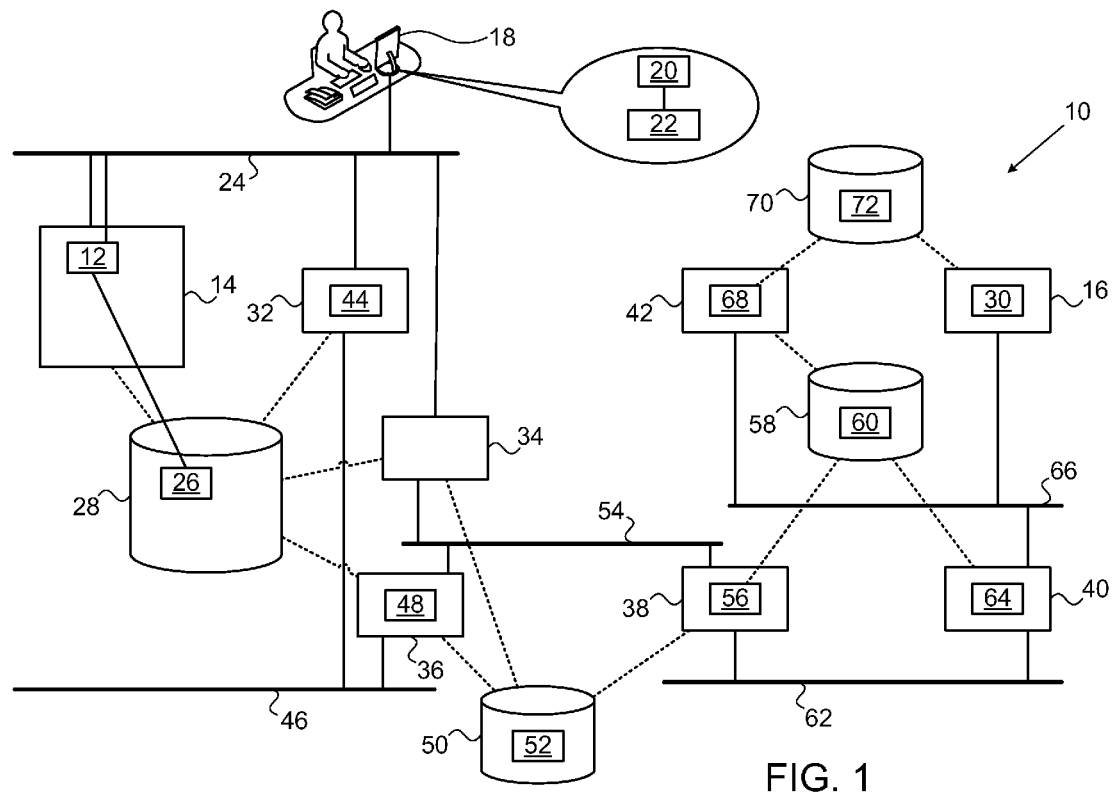
FIG. 1 is a network diagram illustrating a migration plan in accordance with a disclosed embodiment of the invention.

Live virtual machine migration is a way of letting a user on a host machine move one or more VMs between physical machines, normally at different locations, transparently, without noticeable application downtime. In order to achieve live migration a new VM, identical to the source VM, is created on a target physical system, and the state of the source VM (including the entire content of the RAM memory, registers, state of emulated devices, etc) is transferred to the target system (while the source VM is running). When the new VM is ready, the source VM is suspended and the new one takes over.

In particular, the new VM must take over all I/O, including open network connections and storage. In order to achieve the desired transparency to the application and/or user, a cut-over has to be accomplished in a very short time.

To date, live VM migration is typically supported only within a local environment. Within this local environment, the new VM can access the same physical storage and the same physical network (subnet) as the original VM.

There are, however, applications that require migration of the VM to remote environments. This need may be invoked by requirements for, e.g., disaster recovery, proximity to clients, or change of hosting vendor.

A major problem, however, is that long-distance migration causes long application downtimes due to latencies. If the distance is long enough or the network is slow enough, this downtime is noticeable by the application and by clients (e.g., connections may be lost; TCP may back off, severely degrading performance; or application heartbeats may time-out, triggering costly high availability recovery actions). Under such conditions, when one of these undesired events is provoked, the migration can no longer be considered "live".

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

In embodiments of the instant invention, long-distance live VM migration from a source location to a target location is performed by using a series of relatively short hops. The maximum length of hop is dependent upon the nature of the systems and resources involved as well as the application(s) performed by the VM. The hop distance must be sufficiently short so that the migration process is not "noticeable", i.e., it does not cause an interruption of service that exceeds a pre-defined threshold, e.g., 1 second, or provoke any of the above-noted undesired events in the operation of a host computer or one of its applications.

The migration pathway begins at the physical host computer wherein a VM to be migrated initially resides. The physical host is referred to herein as the source location, and it may provide various services via resources used by the VM. Resources residing at the source location are referred to herein as "source resources". These may include, but are not limited to source storage, input and output devices. Provision of these resources and/or their control by the virtual machine to the operating system is termed "virtual machine services". As used in this disclosure, a "hop" is the migration of the virtual machine services including any needed resources and network connections to an operating system from location A to location B, where:
1. Location A may be the source location and location B a first intermediate location, or
2. Location A may be the nth intermediate location and location B may be intermediate location (n+1), where n is an integer, or
3. Location A may be the nth intermediate location and location B may be the target location, where n is an integer; and
4. Migration of virtual machine services from location A to location B consists of:
5. Copying an image of the virtual machine from location A into location B;
6. Copying a memory block used as a resource by the virtual machine from location A into location B; and
7. Re-establishing a network connection of the VM at location A to form a connection location B.

The VM at an nth intermediate location is termed the nth VM copy. The VM copy at the target location is termed the final VM copy. Normally, the VM at a given location would be disposed of once the requisite hardware and software at the subsequent hop location are stable, but it could be retained in order to expedite a rollback, if one is necessary.

In some embodiments, a search may be made to see which of a number of alternate migration routes is optimal according to predetermined optimization criteria, which are explained in further detail hereinbelow. There may be paths involving locations that are considered but not chosen. Thus, until a location is chosen as an intermediate location, it is termed a "candidate intermediate location". Each candidate intermediate location has resources such as storage and network connections available to it that can be potentially exploited by a VM copy. The extent of these resources may be an outcome-determinative factor in the location's candidacy. In particular, any of the VM copies may need to use a network or a memory block within a storage area at the candidate intermediate location.

When VM is migrated via a live migration, there are classes of data that potentially need to be readily available at the final destination. The first class, herein termed "primary data" consists of the data that has to be transferred from location A to location B together with the VM in order to enable the VM to function. This includes, but is not limited to, the state of an active VM, including the entire content of the RAM memory, registers, state of emulated devices, as well as other information needed by the VM. These data elements reside in the RAM of the physical machine, and always need to be replicated. For the sake of brevity, when this disclosure speaks of migrating the VM, it means migrating the VM and the primary data associated with it.

The second class of data, which will hereafter be termed "secondary data", resides on the hard disk of the VM. Secondary data includes, but is not limited to, operating system binaries and application binaries. The secondary data is stored on one or more external storage devices. In performing the migration process of this disclosure, there are times when the destination physical machine to which the VM is being transferred can access the same storage device as the physical machine from which the VM is being transferred. In this case, the information concerning the secondary data location can be simply re-mapped at the destination machine and accessed by the VM copy located there, and without needing to replicate the secondary data. In other cases, where the two machines cannot access the same storage device, replication of the entire storage to a storage device located at or near the destination location is needed in order to achieve the desired migration hop.

Also, in this disclosure the term "direct access" means that direct communication between a source and a destination is not blocked, as it might otherwise be, as for example using firewalls for security reasons, or due to segmentation of the network into private networks, that can't be accessed from outside.

The data initially needed in order to begin a VM migration, is herein termed "input".

Also, as used in this disclosure, the term "hypervisor refers to a virtual machine manager.

Furthermore, in "cold migration", the source VM is suspended using OS-supported or VMM-supported methods. The suspended source VM image is moved by a VMM or other supervisory process to a target location and is then resumed. In contrast, in "live migration", the VMM moves a running VM instance from a source to a target without any noticeable disruption of the VM's activities as defined above. The principles of the invention are applicable to both cold and live migration, but are particularly effective in expanding live migration possibilities in practical network environments where the live migration is over a long distance.
Overview.

The instant invention uses hypervisors created and running in intermediate locations in order to perform long-distance live VM migration. This methodology provides sufficiently short downtimes to retain the benefits of local live migration in addition to the benefits of application migration and cold migration.

This methodology provides a number of benefits. These benefits include but are not limited to the following:
(1) A VM can resume operation after a short and unnoticeable downtime, refresh its network connection and heart-beats, and adjust to a new location (e.g., use a local service).
(2) Distance limitations imposed by storage migration technologies such as synchronous mirroring are eliminated. Fear of timeouts that would be caused by a single long distance migration is removed.
(3) Enhanced connectivity is enabled by using intermediate locations that act as a bridge between administrative or resource network domains, i.e., domains having resources such as printers or file servers, or that enjoy direct access to both the source storage system and the target storage system.

(4) Exploitation of intermediate locations having several types of network connectivity, e.g., locations connected to several network sub-nets and/or storage networks, improves reliability of the migration process.

(5) It is also possible that, for security reasons, the source and target are not allowed to directly "see" each other, and only one or more of the intermediate locations have access to both.

Turning now to the drawings, Reference is initially made to FIG. 1, which is a diagram of a network 10 illustrating a migration plan in accordance with a disclosed embodiment of the invention, wherein source VM 12 in source location 14 is to migrate to target location 16. The network 10 may comprise any number of sub-networks, variously referenced below as source network, intermediate networks, and target network. The sub-networks need not have common characteristics, e.g., common physical and transport layers. In FIG. 1, for convenience of presentation, the term "location" is used as a reference to computing devices and resources that are found at a point on the network, and which participate in one or more stages of the migration. The migration is typically initiated and coordinated using a supervisory computing device 18—the VMM connected within the network 10, and having a processor 20 executing suitable programs in a memory 22 thereof for carrying out the functions and processes described below. Alternatively, the migration can occur under control of a VMM executing at any suitable location, the most likely being the target location.

Source location 14 is connected to source network 24 and uses source secondary data 26 located in source storage 28. Between the source location 14 and target VM 30 are six candidate intermediate locations 32, 34, 36, 38, 40, 42. However, as will be seen from the discussion below, location 34 is not chosen in the selected migration path as an intermediate location. The migration comprises the following steps:

(1) Migrate the source VM 12 from source location 14 to location 32, where it is installed as VM copy 44.

(2) Migrate the network connection of VM copy 44 from source network 24 to intermediate network 46. There are several known techniques by which this can be done using software; for example, the migration can be directed along a new route. In some embodiments, the network traffic is forwarded from the 'home' network to the 'target' network by some kind of relay agent.

(3) Migrate the VM copy 44 from location 32 to location 36, thus creating VM copy 48.

(4) Migrate source secondary data 26 from source storage 28 to intermediate storage 50 where it now becomes intermediate secondary data 52.

(5) Migrate the network connection of VM copy 44 from intermediate network 46 to intermediate network 54.

(6) Migrate VM copy 48 from location 36 to location 38 where it now becomes VM copy 56.

(7) Migrate intermediate secondary data 52 from intermediate storage 50 to intermediate storage 58 where it now becomes intermediate secondary data 60.

(8) Migrate the network connection of VM copy 56 from intermediate network 54 to intermediate network 62.

(9) Migrate VM copy 56 from location 38 to location 40 where it becomes VM copy 64.

(10) Migrate the network connection of VM copy 64 from intermediate network 62 to target network 66.

(11) Migrate VM copy 64 from location 40 to location 42 where it becomes VM copy 68.

(12) Migrate intermediate secondary data 60 from intermediate storage 58 to target storage 70 where it becomes target secondary data 72.

(13) Migrate VM copy 68 from location 42 to target location 16, where it becomes target VM 30. Migrations of a VM and its resources may occur in any order, although there may be times when due to connectivity issues, two or more of the migrations might need to happen simultaneously.

FIRST EMBODIMENT

Figure 2:
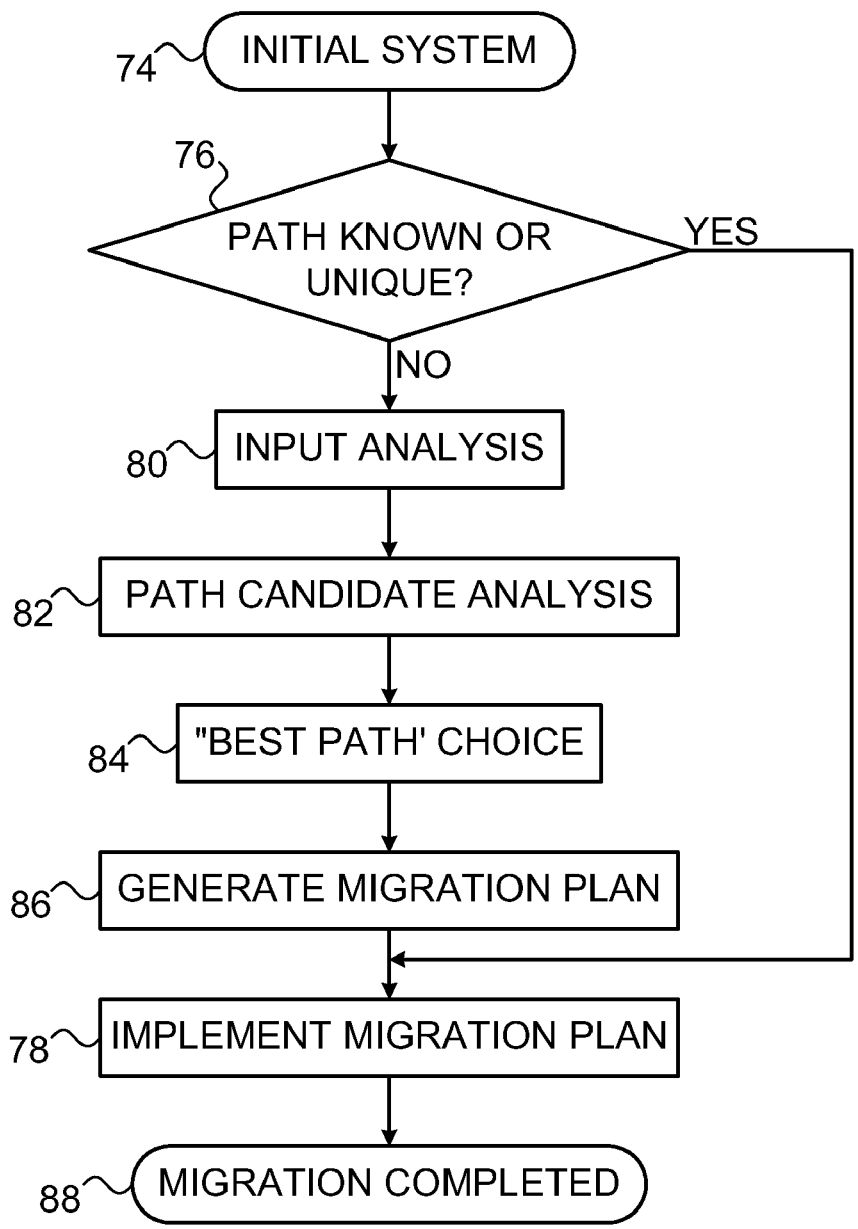
FIG. 2 is a flow chart of a method for live VM remote migration in accordance with a disclosed embodiment of the invention.

Reference is now made to FIG. 2, which is a flow chart of a method for live VM remote migration in accordance with a disclosed embodiment of the invention.

The process generally begins at initial step 74. It is assumed that the source VM 12 has been identified and that all resources used by source VM 12 and all the data (input) needed by the source VM 12 in order to begin the VM migration have been identified. Included in this input are:

(1) The target location.

(2) Environment data, including network configuration (i.e., topology, bandwidth, latency, etc), storage configuration (i.e., topology, bandwidth, latency, etc), potential intermediate hosts (i.e., compatibility, connectivity, capacity, performance, etc).

(3) Characteristics of the workload running in the VM (i.e., network identity and protocols used, heartbeat time-outs, response times, performance goals, etc), and constraints thereof (i.e., certain VLAN connectivity, maximal allowed downtime of the VM as observed by an external agent communicating with the VM via TCP)

(4) Optimization criteria for determining migration hops (i.e., minimal overall migration time, best average performance across the hops, minimal network bandwidth used for migration, minimal storage movement, etc).

It should be noted that in some cases there may be only one possible path, or the best path may be known and represented as a fixed collection of data already in the system. This possibility is tested at decision step 76, where a determination is made whether the migration path is unique or already known. If the determination at decision step 76 is affirmative, then control proceeds to step 78, which is described below.

Otherwise, with the input above all determined, step 80 consists of input analysis.

Next, at step 82, candidate intermediate locations, e.g., second intermediate candidate location 34 (FIG. 1) are analyzed to evaluate their storage devices and the network interconnections, in order to determine candidate migration paths. Algorithms to carry out this analysis take in to account (but are not limited to) to following considerations:

(1) The compatibility of the virtual hardware of the candidate intermediate location with the requirements of the VM.

(2) The availability of resources (e.g. CPU, memory, disk space, etc.) at the candidate intermediate location.

(3) The quality of the network connectivity between candidate intermediate location (e.g., bandwidth, latency), as well as the expected migration impact (e.g., downtime due to memory transfer switch-over).

(4) Whether a given candidate intermediate location has the ability to share storage with its predecessor and/or successor location.

(5) Whether a given candidate intermediate location has the ability to apply storage mirroring, e.g., storage compatibility, bandwidth, latency. Included in this consideration is, if the ability exists, what is the expected migration impact of any downtime due to storage mirror switchover.

(6) Whether a given candidate intermediate location has access to relevant guest virtual networks.

Next, at step 84 the best path is generally chosen based on the predetermined optimization criteria. This selection could be performed entirely by the program, with or without operator interaction, or manually. Optimization criteria could include, but are not limited to:

(1) Anticipated minimal overall migration time.

(2) Anticipated minimal network bandwidth, which would be used by the migration process.

(3) Minimal storage movement.

(4) Best average performance across the hops.

Next at step 86, a corresponding migration plan is generated, in order to migrate the VM along the path that was chosen in step 84. In order to achieve migration of both a VM and its associated storage, such a plan typically involves the following steps to accomplish the hops:

(1) Migrate a VM from location A to location B (where location A and location B share storage).

(2) Migrate the storage associate with the nth VM from the nth device or pool of devices to the n+1th device or pool of devices, wherein the nth VM remains at the same location and has access to both devices/pools.

(3) Migrate a VM from an nth location a n+1th location, while the storage is migrated from the nth device or pool of devices to the n+1st device or pool of devices in parallel (e.g., using synchronous or asynchronous mirroring).

Next, step 78 implements the migration plan. Typically, such implementation involves the following:

1. (optional) Reserve resources along path to ensure their availability.

2. For each hop:

a. Interact with the corresponding management interfaces (hosts, storage, etc) in order to verify that migration is still feasible. If it is not feasible, then recalculate path from the current location to the target location.

b. Start the migration as well while monitoring the migration process.

For each hop:

i. Coordinate VM migration for a next hop, e.g., wait until storage is mirrored before starting migration. Note that this step refers to the switchover of the VM and all its resources, including network and storage, from one location to the next. This switchover must be applied simultaneously, for the VM and for all its associated resources in a coordinated fashion.

ii. Verify that the migration of the hop has been completed.

iii. Wait until the VM at the next location is ready to continue its normal operation based on its workload characteristics (e.g., required minimal wait time, time to re-establish heartbeats).

iv. [Optional] attempt reverse hop that rolls back the migration on failure. The rollback may be to the last hop or as far back as necessary depending upon circumstance.

v. [Optional] It is desirable in some environments to prepare in advance for a succeeding hop, before a current hop is completed. This may involve, e.g., starting resource reservation, and asynchronous mirroring for storage at the succeeding location.

vi. If the VM is at the target location, final step 88 normal operation resumes using the final VM copy and its associated resources at the target location. If the VM is not at the target location, the process iterates at step b(1), described above for the next hop.

SECOND EMBODIMENT

In a second embodiment of the instant invention, multiple hops are applied during concurrent live migration of multiple VMs in environments where an application workload may span several VMs, (e.g., a multi-tier application.

In many cases it can be assumed that the VMs are initially physically near each other in terms of connectivity and QoS. LAN connectivity typically extends up to a range of up to few hundreds meters, translated into sub-millisecond latency/propagation.

There are a number of reasons for requiring proximity of VMs. For example, an application may depend on a maximal latency between a VM serving a database client and a VM supporting a database server.

When such a situation exists, short distance migration of some VMs in the group may be possible, provided that the all VMs stay "close enough" to each other. However, long distance migration of such workloads is a difficult problem, and requires coordination of the migration. This is because the entire group of VMs must be migrated together to insure that distance limitations are never exceeded. Distance is measured or defined according to some distance metric, as mentioned above. Thus, the distance metric between locations of a current copy of the first virtual machine and a current copy of the second virtual machine at each stage of the migrations is always less than a predetermined value.

By using short hops, it is possible to arrange that the entire group of VMs is migrated through intermediate locations hop-by-hop with sufficient concurrency to avoid exceeding distance limitations. Thus, the entire group may move to a first set of locations, prior to migrating any of the VMs to a second set of locations. This ensures that, at any point in time, the entire group spans at most locations that are separated by at most the length of a single hop. By a judicious choice of intermediate locations, the group remains physically close enough to one another to ensure that the workload is not interrupted.

An example of one algorithm that may be used to determine candidate migration paths, is now discussed. The algorithm is for a single VM but could be generalized for multiple VMs.

The problem space can be represented by a weighted graph, in which each vertex represents a candidate VM configuration, and comprises a triplet with the following information: <VM location, storage location, network location>. Candidate migration paths are represented by edges between vertices.

Each vertex and each edge has a weight associated with it. The weight reflects one or more specific 'cost' criteria that are used for path optimization. For vertices, this is the cost of running the workload in a certain configuration; for edges, this is the cost of migrating the workload from one configuration to another. If the migration is not symmetric, that is the cost of migrating a VM from a first location to a second location is different from the cost of migration from the second location to the first location, then the edges are directed For example, if the optimization is based on effect on application performance, the cost quantifies known performance metrics, such as machine cycles used, when running in a certain configuration. Alternatively, if optimization involves migration of a workload between configurations, performance metrics such as bandwidth or time of migration may be used.

The original location of the VM is represented by a vertex in the above graph. While final locations of the VM may each be represented by one or more vertices, e.g., multiple vertices may be used if the source or target host is connected to more than one storage unit.

One methodology for building the weighted graph follows:

The input required in order to build the graph includes, but is not limited to:

(1). Details concerning the environment for each candidate intermediate location as described above in the discussion of step 80 (FIG. 2).

(2). The characteristics of each VM and the workload running in it.

(3). The metrics that will be to assess each candidate intermediate location according to the selected optimization criteria, e.g., application performance.

The following process produces a weighted graph according to the above representation:

(1). Enumerate each of the candidate VM configurations by harvesting the environment data about candidate intermediate locations, storage devices and networks, as well as connectivity between them.

(2). Create a vertex on the graph for each valid configuration.

(3). Identify the configuration representing the original location of the VM, or, in the case of more than one VM being migrated, VMs.

(4). In an alternate embodiment where there may be several possible target locations rather than just one, identify the sub-graph representing valid final locations of each VM.

(5). Analyze the virtual hardware compatibility of each candidate intermediate location with the source VM and discard machines incompatible with the machine wherein the source VM resided prior to migration from further consideration (6). Analyze available live migration capabilities of the host and the environment, such as the storage devices.

(7). Create edges on the graph for pairs of VM configurations between which the migration is feasible, that is VMs at successive locations.

(8). Augment the graph with capacity data (e.g., amount of available memory on each candidate intermediate location).

(9). Analyze the VM characteristics. Eliminate configurations, which do not have sufficient capacity (e.g. CPU characteristics of the candidate locations, memory capacity) to host the VM.

(10). Analyze workload characteristics. Augment the graph with costs associated with each vertex and each edge as determined by the selected metrics.

(11). If there is more than one VM to migrate then repeat steps three through ten for each VM.

Once the weighted graph is created, the optimal migration path is found by the following process:

(1). Using the optimization criteria as a basis, translate the problem finding an optimal route for the VM and its associated resources from source locations to target locations into a problem of finding an optimal path in the above graph. In some embodiments, the target locations may be preselected. Alternatively, the targets may be optimized automatically by iterations of the following algorithm, target locations being chosen from qualified target locations in different iterations.

(2). Traverse the various paths for the VM and its associated resources from their source locations to their target locations.

(3). Find the optimal path based on a selected optimization function.

Optionally, more than a single near-optimum path may be identified. Paths whose analysis yield a cost or other quantitative measure that is within a certain predetermined difference (e.g., 5%) from the optimal path are typical examples of such alternatives. In such cases, the choice between the paths may be carried out by an external decision mechanism, e.g., by a human operator or a predetermined arbitration scheme. The disfavored paths then become convenient alternatives should difficulties arise in the course of the actual migration.

One of the considerations in the choice of an optimal migration path concerns virtual hardware compatibility. Problems within this area may mean that additional programming is needed in order to allow a VM to run at a certain location or even preclude a given location from being used at all as a host for a VM copy. Hardware compatibility requirements differ between different virtualization platforms and live VM migration implementations. For example, on x86 platforms, live VM migration is usually carried out with ease between CPUs of the same family (e.g., Intel x86_64). However, attempting live migration where CPUs are of a different family, for example, from a 32-bit physical host to a 64-bit physical host, or from a host with an Intel processor to a host with an AMD processor, can be problematic. Other problems can occur based on platform requirements. For example, live migration on IBM's POWER6® platform requires the physical machines to be configured with the same Logical Memory Block (LMB) size, and to have compatible firmware versions.

Moreover, the compatibility requirements also depend on the particular OS/application running within the VM—in particular, on the degree to which the running OS/application is aware of (or dependent on) the actual hardware on which it is running As an example, in some cases, e.g., for performance reasons, para-virtualized (i.e., virtualization-aware) drivers are installed in a guest OS, which are designed to work with the actual hardware device type, bypassing the hypervisor, rather than an abstract or emulated device exposed by the hypervisor. As another example, some types of software are designed to work with specific hardware devices. For instance, a software license may limit operation to hardware having a specific CPU serial number. Another possible problem may arise where an application uses non-standard CPU instructions or features, which might be available on the machine on which they were originally configured to run, but might not be available on other machines. When migrated to an incompatible machine, the application could crash or behave unpredictably.

In addition to awareness of, or dependency on particular physical hardware, an application might depend on certain configuration of the I/O virtualization layers within each hypervisor. For example, certain applications might require certain kinds of network traffic, e.g., multicasts, to be supported or allowed to run by the virtual switch within the hypervisor.

While hardware considerations can impact greatly on the choice of an optimum migration path, other factors must also be taken into account no matter what tool or tools are used in the determination.

For example, reverting to the migration scheme shown in FIG. 1, a number of possible considerations could have led to the choice of the described migration path rather than other possible paths. Consider that, in analyzing the path possibilities in step 82 (FIG. 2), assume that it was found that target location 16 is attachable to source storage 28. This would technically source VM 12 to migrate directly from source location 14 to target location 16. However, due to latencies between source location 14 and target location 16, the application performance degradation during such a migration exceeds a defined threshold, i.e., becomes "noticeable", and therefore such a migration path is rejected. This problem occurs where the application is slowed due to the resources being temporarily located at opposite ends of a given hop. For example, the VM might be at location n+1 while the application program is still stored at location n. This response time threshold is dependent upon the hardware but is typically about 1 ms.

Additionally, it may have been determined that although source VM 12 can be migrated to location 38 via location 34, which would involve one hop less than the actually chosen path, the CPU of location 34 was overloaded at that time, making this option less attractive.

Finally, although it may have been technically possible to migrate the VM copy 64 from location 40 to target location 16 and the intermediate secondary data 60 from intermediate storage 58 to location 40 simultaneously, assuming limited network bandwidth available between them, the application downtime in such a migration would be too high, making this option also less attractive.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized in the above embodiments. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any tangible or intangible medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flow-chart illustrations and/or block diagrams, can be implemented by computer program instructions. These computer program instructions may be provided to a processor of a general purpose computer, special purpose computer, or other programmable data processing apparatus, containing at least processor 20 and memory 22, to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus, containing at least processor 20 and memory 22, to function in a particular manner, such that the instructions stored in the computer-readable readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flowchart and/or block diagram block or blocks.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method of computing, comprising:
 identifying a target location for live migration of virtual machine services from a source location;
 identifying candidate paths from the source location to the target location, the candidate paths comprising a series of hops via intermediate locations;
 choosing optimization criteria for evaluation of the candidate paths;
 performing an analysis of the candidate paths according to the chosen optimization criteria,
 selecting a migration path from the candidate paths responsively to the analysis;
 generating a migration plan comprising the steps of:
 in a first hop along the migration path:
 delivering the virtual machine services to an operating system from the source location;

migrating the virtual machine services a first time via a data network from the source location to an intermediate location; and
delivering the virtual machine services to the operating system from the intermediate location;
in a second hop along the migration path:
migrating the virtual machine services a second time from the intermediate location to the target location via the data network; and
delivering the virtual machine services to the operating system from the target location;
executing the first hop:
thereafter making a determination of feasibility of continued migration using the second hop; and
responsively to the determination of feasibility executing the second hop in the migration path,
wherein breaks in the virtual machine services to the operating system while migrating the virtual machine services a first time are less than a predefined limit, and breaks in the virtual machine services to the operating system while migrating the virtual machine services a second time are less than the predefined limit.

2. The method according to claim 1, wherein migrating the virtual machine services comprises:
copying an image of a virtual machine from one location into another location, wherein the virtual machine has a first network connection at the one location;
copying a memory block that is used as a resource by the virtual machine from the one location into the other location; and
re-establishing the first network connection as a second network connection at the other location.

3. The method according to claim 1, wherein the data network comprises an administrative domain and a resource domain, that are both accessible only from the intermediate location.

4. The method according to claim 1, wherein the source location and the target location are directly accessible from the intermediate location, and the source location cannot be directly accessed from the target location.

5. The method according to claim 1, further comprising:
prior to completion of migrating the virtual machine services from a first location to a second location performing at least one of:
reserving a resource at a third location; and
establishing synchronous mirroring at the third location; and
thereafter migrating the virtual machine services from the second location to the third location.

6. The method according to claim 1, wherein the virtual machine services are provided by a plurality of virtual machines including at least a first virtual machine providing first virtual machine services and a second virtual machine providing second virtual machine services that are migrated from first and second source locations, to first and second target locations, respectively, the method further comprising:
selecting respective first and second migration paths for the first and second virtual machine services; and
coordinating the steps of migrating the first and second virtual machine services from the first and second source locations to respective first and second intermediate locations and migrating the virtual machine services from the first and second intermediate locations to the first and second target locations, wherein during a coordinated migration of the first and second virtual machine services a distance metric between a current intermediate location in the first migration path and a current intermediate location in the second migration path is less than a predetermined value, wherein an application workload requires the first and second virtual machine services.

7. A computer software product, including a non-transitory computer-readable storage medium in which computer program instructions are stored, which instructions, when executed by a computer, cause the computer to perform the steps of:
identifying a target location for live migration of virtual machine services from a source location;
identifying candidate paths from the source location to the target location, the candidate paths comprising a series of hops via intermediate locations;
choosing optimization criteria for evaluation of the candidate paths;
performing an analysis of the candidate paths according to the chosen optimization criteria,
selecting a migration path from the candidate paths responsively to the analysis;
generating a migration plan comprising the steps of:
in a first hop along the migration path:
delivering the virtual machine services to an operating system from the source location;
migrating the virtual machine services a first time via a data network from the source location to an intermediate location; and
delivering the virtual machine services to the operating system from the intermediate location;
in a second hop along the migration path:
migrating the virtual machine services a second time from the intermediate location to the target location via the data network; and
delivering the virtual machine services to the operating system from the target location;
executing the first hop:
thereafter making a determination of feasibility of continued migration using the second hop; and
responsively to the determination of feasibility executing the second hop in the migration path,
wherein breaks in the virtual machine services to the operating system while migrating the virtual machine services a first time are less than a predefined limit, and breaks in the virtual machine services to the operating system while migrating the virtual machine services a second time are less than the predefined limit.

8. The computer software product according to claim 7, wherein migrating the virtual machine services comprises:
copying an image of a virtual machine from one location into another location, wherein the virtual machine has a first network connection at the one location;
copying a memory block that is used as a resource by the virtual machine from the one location into the other location; and
re-establishing the first network connection as a second network connection at the other location.

9. The computer software product according to claim 7, wherein the data network comprises an administrative domain and a resource domain, that are both accessible only from the intermediate location.

10. The computer software product according to claim 7, wherein the source location and the target location are directly accessible from the intermediate location, and the source location cannot be directly accessed from the target location.

11. The computer software product according to claim 7, wherein the instructions cause the computer to perform the additional steps of:
prior to completion of migrating the virtual machine services from a first location to a second location performing at least one of:
reserving a resource at a third location; and
establishing synchronous mirroring at the third location; and
thereafter migrating the virtual machine services from the second location to the third location.

12. The computer software product according to claim 7, wherein the virtual machine services are provided by a plurality of virtual machines including at least a first virtual machine providing first virtual machine services and a second virtual machine providing second virtual machine services that are migrated from first and second source locations, to first and second target locations, respectively, wherein the instructions cause the computer to perform the additional steps of:
selecting respective first and second migration paths for the first and second virtual machine services; and
coordinating the steps of migrating the first and second virtual machine services from the first and second source locations to respective first and second intermediate locations and migrating the virtual machine services from the first and second intermediate locations to the first and second target locations, wherein during a coordinated migration of the first and second virtual machine services a distance metric between a current intermediate location in the first migration path and a current intermediate location in the second migration path is less than a predetermined value, wherein an application workload requires the first and second virtual machine services.

13. A data processing system, comprising:
a processor linked to a data network;
a memory accessible to the processor storing programs and data objects therein, wherein execution of the programs cause the processor to perform the steps of:
identifying a target location for live migration of virtual machine services from a source location;
identifying candidate paths from the source location to the target location, the candidate paths comprising a series of hops via intermediate locations;
choosing optimization criteria for evaluation of the candidate paths;
performing an analysis of the candidate paths according to the chosen optimization criteria,
selecting a migration path from the candidate paths responsively to the analysis;
generating a migration plan comprising the steps of:
in a first hop along the migration path:
delivering the virtual machine services to an operating system from the source location;
migrating the virtual machine services a first time via the data network from the source location to an intermediate location; and
delivering the virtual machine services to the operating system from the intermediate location;
in a second hop along the migration path:
migrating the virtual machine services a second time from the intermediate location to the target location via the data network; and
delivering the virtual machine services to the operating system from the target location;
executing the first hop;
thereafter making a determination of feasibility of continued migration using the second hop; and
responsively to the determination of feasibility executing the second hop in the migration path,
wherein breaks in the virtual machine services to the operating system while migrating the virtual machine services a first time are less than a predefined limit, and breaks in the virtual machine services to the operating system while migrating the virtual machine services a second time are less than the predefined limit.

14. The data processing system according to claim 13, wherein migrating the virtual machine services comprises:
copying an image of a virtual machine from one location into another location, wherein the virtual machine has a first network connection at the one location;
copying a memory block that is used as a resource by the virtual machine from the one location into the other location; and
re-establishing the first network connection as a second network connection at the other location.

15. The data processing system according to claim 13, wherein the data network comprises an administrative domain and a resource domain, that are both accessible only from the intermediate location.

16. The data processing system according to claim 13, wherein the source location and the target location are directly accessible from the intermediate location, and the source location cannot be directly accessed from the target location.

17. The data processing system according to claim 13, wherein the processor is operative to perform the additional steps of:
prior to completion of migrating the virtual machine services from a first location to a second location performing at least one of:
reserving a resource at a third location; and
establishing synchronous mirroring at the third location; and
thereafter migrating the virtual machine services from the second location to the third location.

18. The data processing system according to claim 13, wherein the virtual machine services are provided by a plurality of virtual machines including at least a first virtual machine providing first virtual machine services and a second virtual machine providing second virtual machine services that are migrated from first and second source locations, to first and second target locations, respectively, wherein the processor is operative to perform the additional steps of:
selecting respective first and second migration paths for the first and second virtual machine services; and
coordinating the steps of migrating the first and second virtual machine services from the first and second source locations to respective first and second intermediate locations and migrating the virtual machine services from the first and second intermediate locations to the first and second target locations, wherein during a coordinated migration of the first and second virtual machine services a distance metric between a current intermediate location in the first migration path and a current intermediate location in the second migration path is less than a predetermined value, wherein an application workload requires the first and second virtual machine services.

19. The method according to claim 1, wherein the optimization criteria comprise minimization of at least one of a required network bandwidth and a storage movement, overall migration time, and maximization of average performance across the hops.

20. The method according to claim 1, wherein the analysis of the candidate paths further comprises at least one of an evaluation of compatibility of virtual hardware at the intermediate locations with a virtual machine, a quality of network interconnections at the intermediate locations, a capability of accessing a guest virtual network at the intermediate locations and a capability of the intermediate locations to share storage with predecessor and successor intermediate locations, and an expected downtime due to a storage mirror switchover.

21. The computer software product according to claim 7, wherein the optimization criteria comprise minimization of at least one of a required network bandwidth and a storage movement, overall migration time, and maximization of average performance across the hops.

* * * * *